United States Patent [19]

Kafadar

[11] Patent Number: 5,321,726

[45] Date of Patent: Jun. 14, 1994

[54] CALIBRATION OF VECTOR DEMODULATOR USING STATISTICAL ANALYSIS

[75] Inventor: Karen Kafadar, Palo Alto, Calif.

[73] Assignee: Hewlett-Packard Company, Palo Alto, Calif.

[21] Appl. No.: 977,735

[22] Filed: Nov. 13, 1992

Related U.S. Application Data

[63] Continuation of Ser. No. 268,912, Nov. 28, 1988, abandoned, which is a continuation-in-part of Ser. No. 143,394, Jan. 13, 1988, abandoned.

[51] Int. Cl.$^5$ .............................................. H03D 3/02
[52] U.S. Cl. ........................................ 375/79; 375/10; 375/39; 455/226.1; 328/166
[58] Field of Search ...................... 375/39, 57, 58, 98, 375/99, 101, 10, 102; 455/295, 296, 226.1; 328/162, 163, 165, 166

[56] References Cited

U.S. PATENT DOCUMENTS

| | | | |
|---|---|---|---|
| 4,138,645 | 2/1979 | Parato | 455/226.1 |
| 4,328,552 | 5/1982 | Stovall | 364/554 |
| 4,381,546 | 4/1983 | Armstrong | 375/39 |
| 4,439,863 | 3/1984 | Bellamy | 375/39 |
| 4,503,545 | 3/1985 | Bremer et al. | 375/101 |
| 4,631,738 | 12/1986 | Bett et al. | 375/98 |
| 4,683,578 | 7/1987 | Bett et al. | 375/98 |
| 4,709,377 | 11/1987 | Martinez et al. | 375/39 |

Primary Examiner—Stephen Chin
Assistant Examiner—Young Tse

[57] ABSTRACT

In the calibration of a vector demodulator, a statistical approach is used for the analysis and correction of received data. The magnitude of each vector, defined by an (I,Q) pair in a received data signal, is examined. If each measured magnitude has a predetermined value, calibration is not necessary. However, if the vector magnitudes differ from this value, a number of samples of the data signal are used to define a linearly transformed circle. The transformation parameters of this model are then calculated, for example using a least squares analysis. These parameters are related to the system errors to be corrected, and hence can be used to determine calibration factors which are employed to adjust the received information and produce actual data values.

4 Claims, 6 Drawing Sheets

CALIBRATION OF VECTOR DEMODULATOR USING STATISTICAL ANALYSIS

CROSS REFERENCE TO RELATED APPLICATION

This is a continuation of copending application Ser. No. 07/268,912 filed Nov. 28, 1985, now abandoned, which is a continuation-in-part of application Ser. No. 143,394 filed Jan. 13, 1988, abandoned.

BACKGROUND OF THE INVENTION

The present invention is directed to the calibration of data receivers, and is particularly concerned with the calibration of vector demodulators for receiving data transmitted by means of quadrature modulation format.

Demodulators for data that is transmitted with quadrature modulation, such as phase shift keyed (PSK) data, can introduce losses into the received data as a result of various conditions inherent in the demodulator. Examples of these conditions include gain imbalance in which the in-phase signal is amplified by a different amount than the quadrature signal, quadrature imbalance in which the phase difference between the two signals is not precisely 90°, DC offsets in either or both of the in-phase and quadrature channels and scale errors resulting from the net effect of gains and losses in the system. Each of these potential sources of signal loss must be measured to determine calibration factors. Once determined, these factors are used to adjust the system and transform the received data into actual data.

In the past, the determination of the calibration factors is made by transforming the received signal into the frequency domain and analyzing the power spectrum of the received signal. In this approach, each of the calibration factors are separately determined. Typically, the DC offsets of the system are first measured. Once the received signal is adjusted for these offsets, gain imbalance is determined. After adjustment for the gain imbalance, quadrature imbalance is determined. Unfortunately, these various factors are not independent of one another. If one is changed, the others may vary as well. As a result, after an initial determination has been made for each of these factors, they must be successively reevaluated and readjusted. Thus, it is not always possible to have each of the errors converge to zero. Typically, in such a case the calibration process is terminated once the quadrature error has been brought to zero, even if the other errors cannot be completely corrected.

Another drawback associated with the traditional approach of transforming the measurements into the frequency domain and determining calibration factors from the power spectrum relates to the fact that this approach requires two signals of known frequency with continuously varying phase. As such, common signal formats such as 8PSK do not provide sufficient information for calibration to be performed. However, the 8PSK mode of operation is preferred, since it results in an easier and faster generation of vector measurements.

Furthermore, spectral methods of the type traditionally employed to perform calibration measurements are highly sensitive to anomalies in system performance which may be due to random disturbances, e.g. accidental bumping of the equipment or temperature fluctuations. As a result, the calibration factors that are determined may be seriously biased.

It is desirable therefore to provide a method for calibrating data receivers, such as vector demodulators, which avoids these drawbacks. In particular, it is desirable to provide a calibration method that enables all calibration factors to be determined simultaneously, and thereby account for the interdependence of such factors. Along these lines, it is also desirable to provide a calibration technique which enables an 8PSK mode to be used as well as a continuously varying phase, and which can account for aberrations which may be introduced by random disturbances in the system.

BRIEF STATEMENT OF THE INVENTION

In accordance with the present invention, the drawbacks associated with prior art calibration techniques are overcome by using a statistical approach to the analysis and correction of received data. Briefly, in the technique of the present invention, the magnitude of each vector defined by an (I,Q) pair in a received data signal, such as an 8PSK signal, is examined. If each measured magnitude has a predetermined value, e.g. one, calibration is not necessary. However, if the vector magnitudes differ from this value, a number of samples of the data signal are used to define a model, in particular a linearly transformed circle. The transformation parameters of this model are then calculated, for example using a least squares analysis, and more preferably robust regression. These parameters are related to the system errors to be corrected, and hence can be used to determine calibration factors which are employed to adjust the received information and produce actual data values.

Since the parameters of the model are simultaneously derived from the least squares analysis, the interdependence of the calibration factors is inherently taken into account. When robust regression is employed, aberrant measurements are down weighted so as to reduce their undesirable influence in the determination of the calibration factors, thereby resulting in more appropriate values.

Further features of the invention and the advantages provided thereby are explained in greater detail hereinafter with reference to specific examples illustrated in the accompanying drawings.

DESCRIPTION OF THE ILLUSTRATED EMBODIMENT

To facilitate an understanding of the features and advantages of the present invention, it is described with reference to its implementation in the context of a vector demodulator. Further in this regard, specific examples of the invention are illustrated in connection with the use of an 8-state phase shift keyed (8PSK) signal. It will be appreciated, however, that the practical applications of the invention are not limited to this particular embodiment. For example, it can be used with equal success in connection with the reception of a signal having a continuously varying phase, or other non-continuous signals such as 16 QAM or 64 QAM. Further, the general concepts which underlie the invention are not limited in their applicability to the particular type of demodulator described herein.

Figure 1:
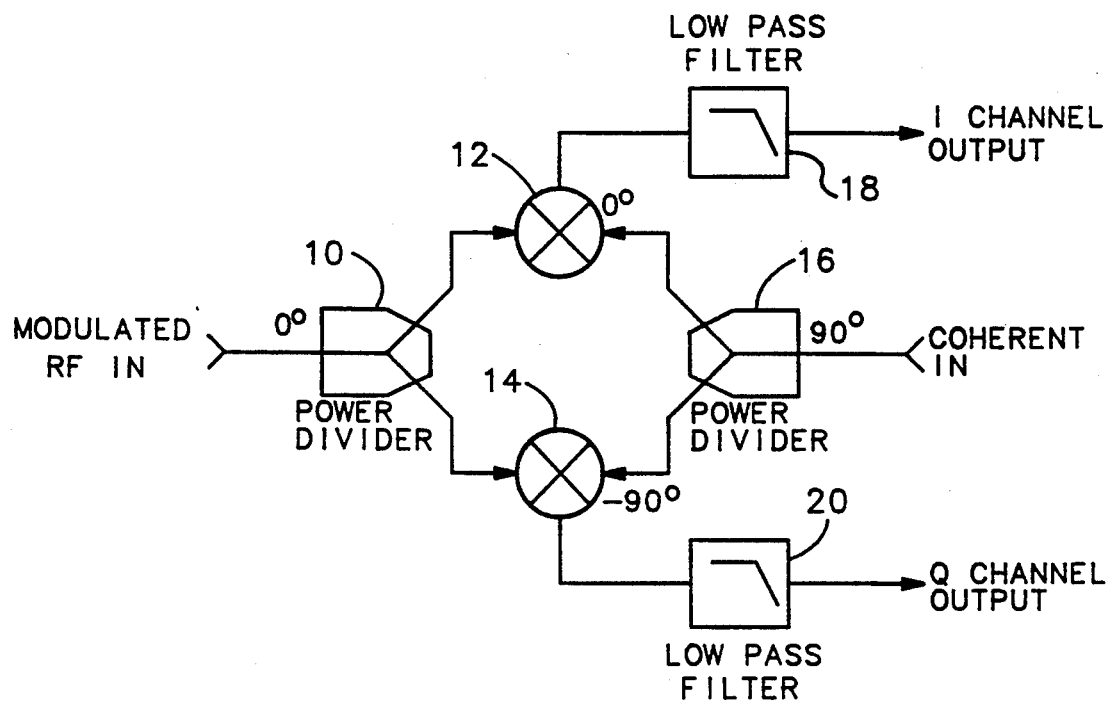
FIG. 1 is a block diagram illustrating the general components of a vector demodulator.

To further facilitate an understanding of the invention, the general makeup of a vector demodulator will be described. Referring to FIG. 1, a modulated RF signal at an intermediate frequency $\omega_0 + \omega_1$ is applied to a power divider 10. The divider splits the input signal into two equal components, which are respectively applied to one input terminal of a pair of mixers 12, 14. A reference signal at a frequency $\omega_0$ is applied to another power divider 16. This divider splits the reference signal into two coherent in-phase and quadrature reference signals. The in-phase reference signal is applied to the other input terminal of the mixer 12, and the quadrature reference signal is applied to the second input terminal of the mixer 14. The output signal from the mixer 12 is the in-phase component of the modulated signal, having a frequency $\omega_1$. The output signal from the mixer 14 is the quadrature component of the modulated signal, also at the frequency $\omega_1$. Each of these component signals are passed through low pass filters 18, 20, respectively, to obtain the difference frequency terms, and then applied to respective I and Q channel output terminals.

Operating parameters of the various components in the vector demodulator can produce errors in the demodulated signal. For example, differences in the gain of the mixers 12 and 14 can result in a gain imbalance between the I and Q channels. Similarly, a phase difference between the two output signals from the power divider 10, or a phase difference other than 90° in the output signals from the power divider 16, can result in a quadrature error between the channels. Other sources of error can include DC offsets that are introduced into the respective I and Q channels by the mixers 12, 14 and low pass filters 18, 20, as well as scaling errors that may be caused by amplifier compression and other overall gains and losses within the system.

Each of these sources of possible error must be measured, and the results of such measurements used to transform the received I and Q values into actual data. More particularly, each received coordinate value defined by an (I,Q) pair is transformed into a measured coordinate (x, y) through a series of steps. In the first step, the (I,Q) pair is adjusted to compensate for quadrature imbalance and gain imbalance. The results of these adjustments are then multiplied by a scaler factor, and then offset by a fixed amount. The resultant point (x, y) can be expressed as a function of the received pair (I,Q) as:

$$\begin{bmatrix} x \\ y \end{bmatrix} = \rho \begin{bmatrix} \gamma & 0 \\ \sin \phi & \cos \phi \end{bmatrix} \begin{bmatrix} I \\ Q \end{bmatrix} + \begin{bmatrix} I_0 \\ Q_0 \end{bmatrix} + \begin{bmatrix} \epsilon_x \\ \epsilon_y \end{bmatrix}$$

Where:
$\gamma$ equals the gain ratio between the I and Q channels;
$\phi$ equals the angular difference between ideal quadrature (90°) and actual quadrature;
$\rho$ equals the scale factor;
$I_o$ equals the DC offset in the I-channel;
$Q_o$ equals the DC offset in the Q-channel; and
$\epsilon_x, \epsilon_y$ are uncorrelated random errors in the measurement of the x and y coordinates.

Figure 2:
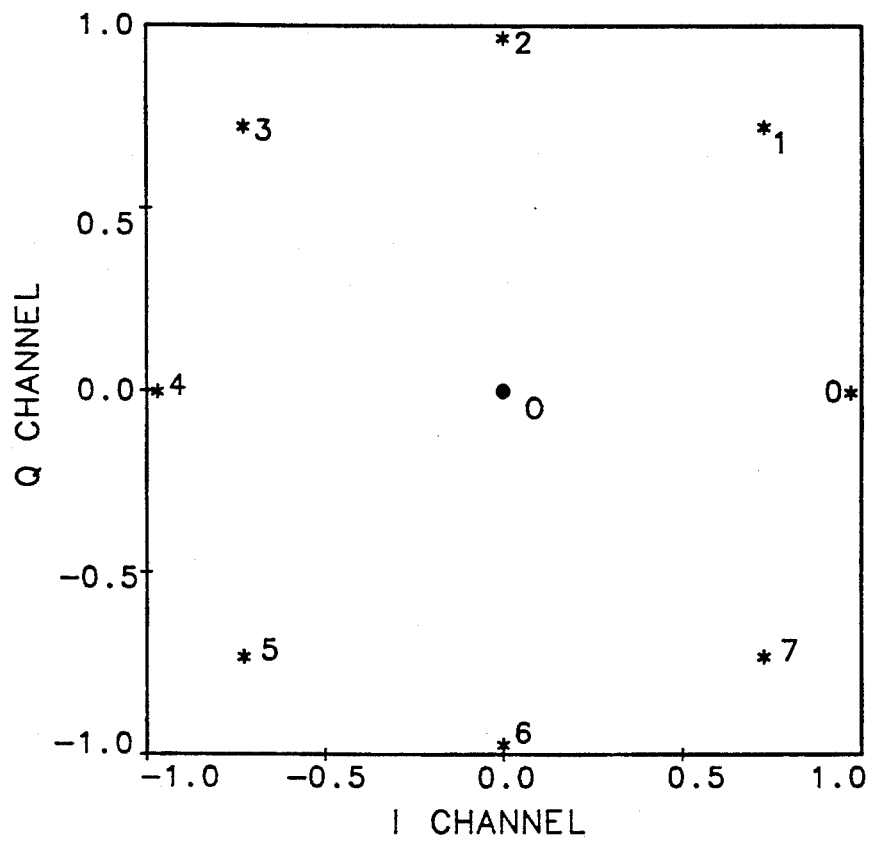
FIG. 2 is a graph illustrating the eight ideal states of an 8PSK signal.

In accordance with the present invention, the quantification of each of the factors which define the gain ratio, quadrature imbalance, scaling and DC offsets is obtained through statistical analysis of the received information. To obtain the data for analysis, a signal containing a suitable amount of data, for example an 8PSK signal having eight evenly-distributed phase states, is generated and received at the demodulator. Each state defines a vector having a magnitude of one, and these vectors are successively located at the points having the phases K(45°), where K=0, 1, ..., 7. A graphic representation of these eight states is illustrated in FIG. 2, where the states are respectively labeled 0-7. It can be seen that each of the eight states lies on a circle when an 8PSK signal is employed.

Figure 3:
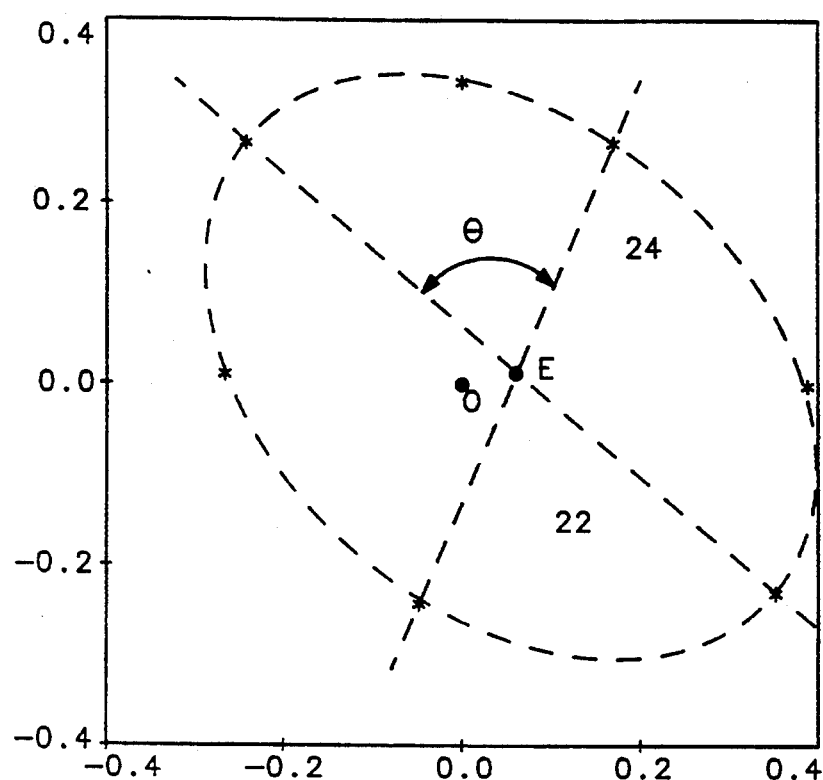
FIG. 3 is a graph illustrating an example of a received 8PSK signal.

Under ideal conditions, i.e. with no errors in the demodulator or the transmission system, the received (I,Q) pairs would also appear as shown in FIG. 2. When error conditions such as gain imbalance, quadrature imbalance and the like are present, however, not all of the received data points will lie on the circle. Rather, a plot of the received (I,Q) pairs might appear as shown in FIG. 3. As can be seen, the plot of the received data defines an ellipse. This ellipse is characterized by a set of parameters. In accordance with the invention, these parameters can be related to the possible error conditions present in the system, and thus used to define the calibration factors.

Figure 5A:
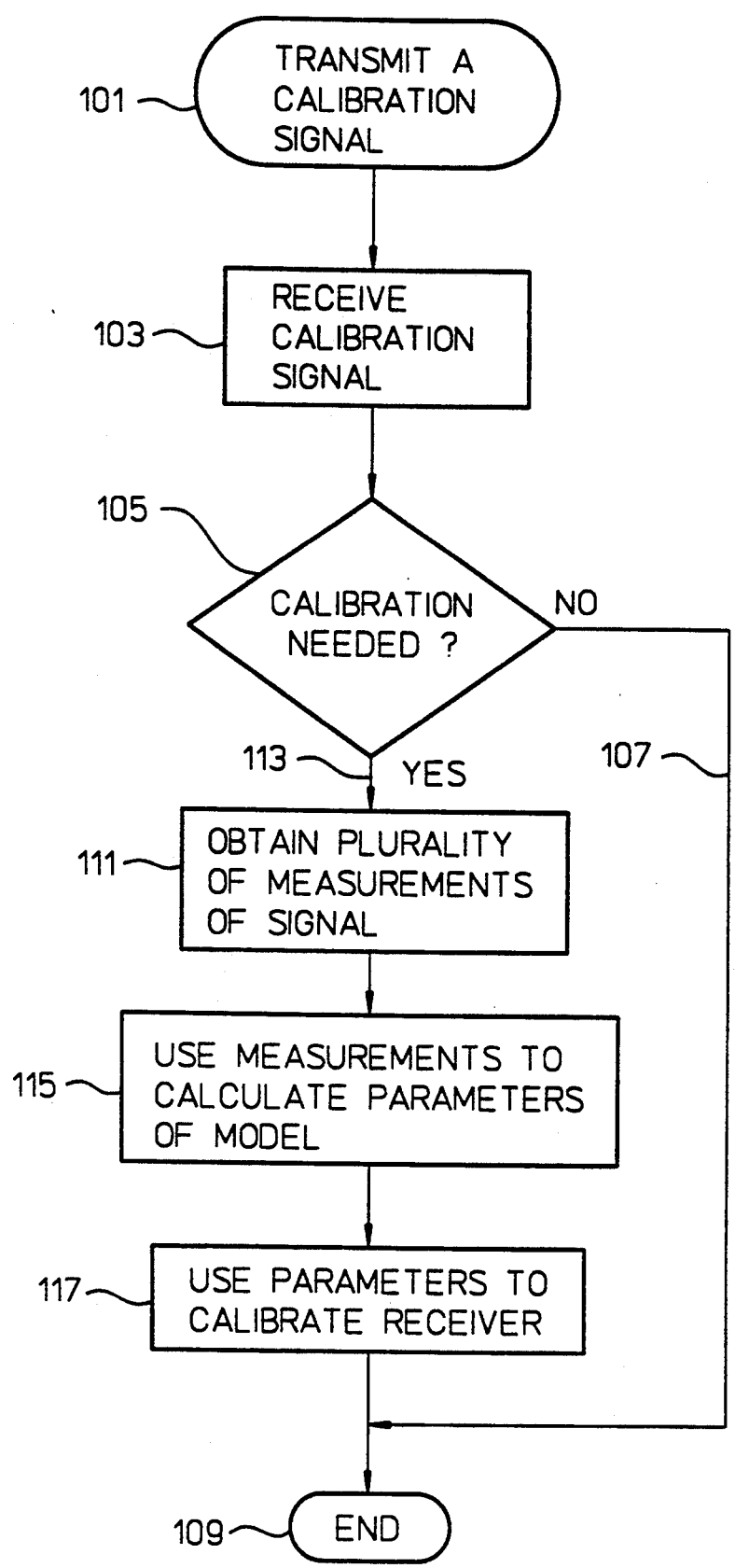
FIG. 5A is a flowchart depicting an embodiment of a method of calibrating a receiver according to the invention.
Figure 5B:
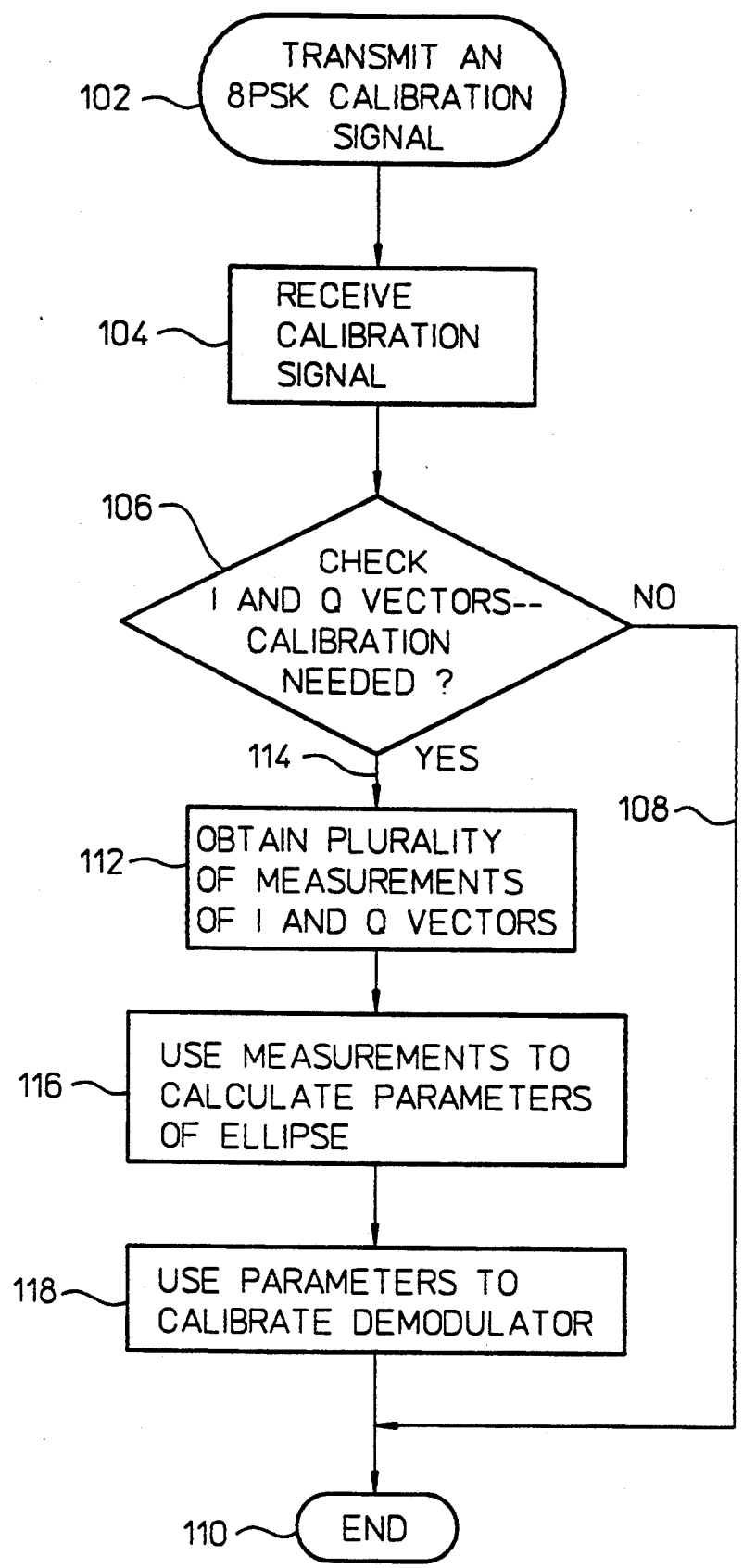
FIG. 5B is a flowchart depicting an embodiment of a method of calibrating a vector demodulator by means of an 8PSK signal according to the invention.
Figure 5C:
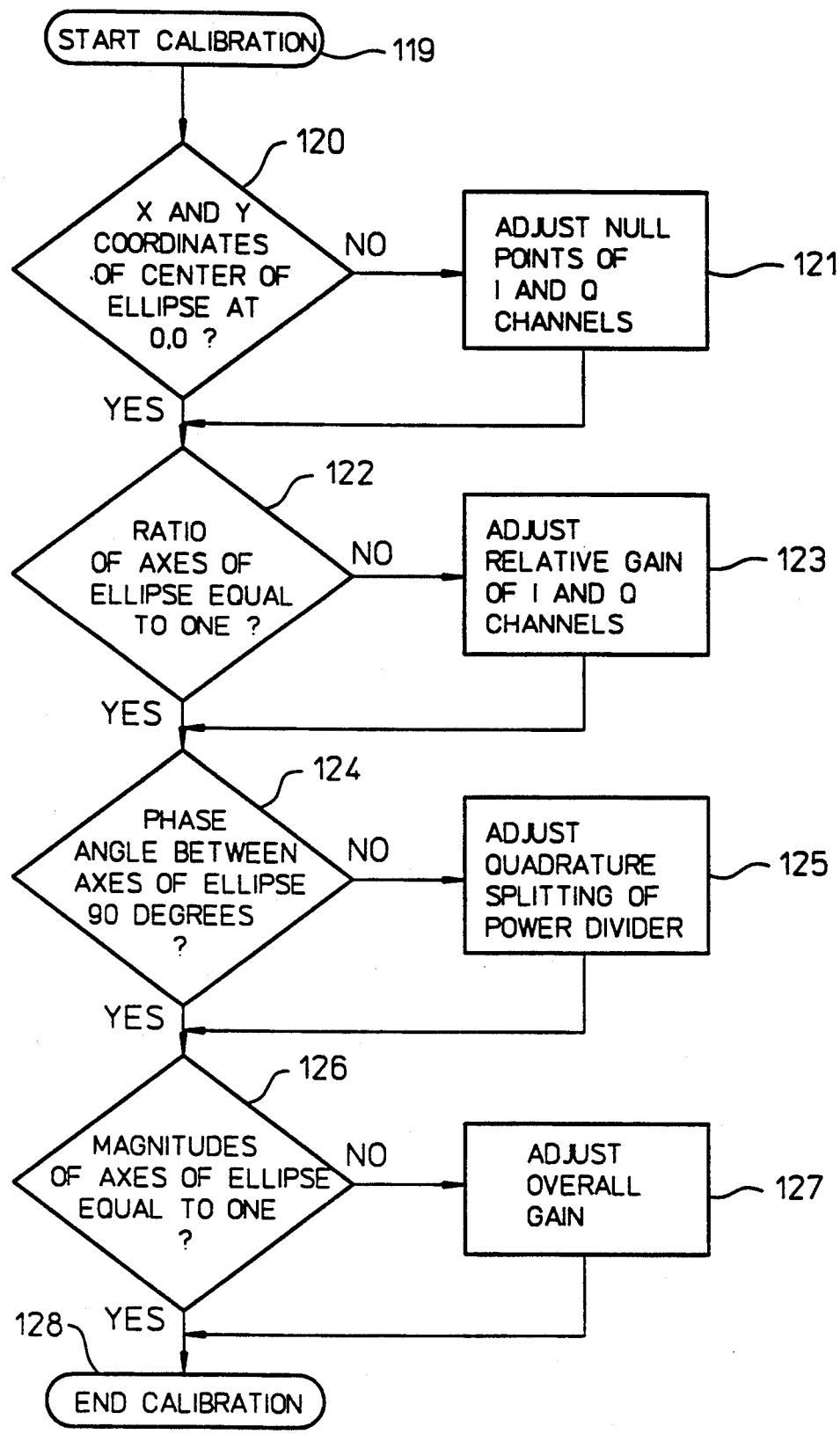
FIG. 5C is a flowchart showing more details of an embodiment of the "use parameters to calibrate demodulator" block of FIG. 5B.

A preferred embodiment of a method of calibration according to the invention is depicted in flowchart form in FIGS. 5A, 5B and 5C. FIG. 5A expresses this method in a general form, FIG. 5B expresses this method more particularly in the context of using an 8PSK signal to calibrate a vector demodulator, and FIG. 5C gives more details of the embodiment shown in FIG. 5B. To calibrate a receiver such as a vector demodulator according to the method of the invention a signal such as an 8PSK signal which ideally produces the set of states shown in FIG. 2 is continuously transmitted (block 101 of FIG. 5A, block 102 of FIG. 5B) and received (block 103 of FIG. 5A, block 104 of FIG. 5B) at the demodulator. The magnitude of each vector defined by an (I,Q) pair is measured (block 105 of FIG. 5A, block 106 of FIG. 5B). If the magnitude of each vector is equal to one, the demodulator is functioning properly and no calibration adjustments are necessary, as indicated in FIG. 5A by a line 107 which extends from a "no" output of the block 105 to an "end" block 109 and in FIG. 5B by a line 108 from a "no" output of the block 106 to an "end" block 110. If the magnitudes are not equal to one, a suitable number, n, of measurements of the signal are taken, preferably so that n/8 points are measured for each state, as indicated in FIG. 5A by a block 111 and a line 113 which extends from a "yes" output of the block 105 to the block 111, and in FIG. 5B by a block 112 and a line 114 which extends from a "yes" output of the block 106 to the block 112. The parameters of the geometric model defined by the measured points are then obtained using any suitable form of regression analysis, preferably nonlinear weighted least squares analysis (block 115 of FIG. 5A, block 116 of FIG. 5B).

Referring to FIG. 3, the ellipse defined by the measured points can be characterized by five parameters. These parameters comprise the x and y coordinates of the center E of the ellipse, the ratio of the lengths of the principal axes 22, 24 for the ellipse, the angle $\theta$ between the two principal axes, and the length of the major axis 22, which is related to the magnitude of the vectors defined by the points. Each of these parameters can be defined by conventional regression analysis techniques. In a preferred embodiment of the invention, a nonlinear least squares approach is used to define the parameters for the ellipse. For a description of this approach, reference is made to Draper et al, *Applied Regression Analysis*, Wiley: New York, 2d Ed., particularly at pp. 458–469.

Each of the determined parameters for the geometric model can be related to an error condition in the demodulator. More particularly, the x and y coordinates for the center E of the ellipse, relative to the origin O of the ideal model, respectively relate to the DC offsets $I_o$ and $Q_o$ in the I and Q channels. The ratio of the lengths of the principal axes 22 and 24 reflects the gain imbalance in the system. The skew of the principal axes, i.e. the difference between $\theta$ and 90°, represents the quadrature error of the system. Finally, the multiplication factor necessary to make the magnitude of each vector defined by the measured points equal to one relates to the scaling factor. Thus, by determining the standard parameters of the ellipse, the calibration factors necessary to transform the received information into actual data can be obtained.

The parameters are used to calibrate the receiver (block 117 of FIG. 5A, block 118 of FIG. 5B). In the particular case of a vector demodulator, as depicted starting at block 119 of FIG. 5C, the DC offsets $I_o$ and $Q_o$ which are determined from the location of the center E of the ellipse are used to adjust the null points of the I-channel and Q-channel mixers 12 and 14 (blocks 120 and 121). This can be done, for example, by means of manual or electrical null adjustments applied to components associated with the mixers 12 and 14 in the I and Q channels in a manner known to those skilled in the art, but preferably the DC offsets $I_o$ and $Q_o$ are used to transform the raw I and Q output signals as provided by the vector demodulator. In a preferred embodiment a computer receives the raw signals, calculates the calibration factors, and uses the calibration factors to transform or adjust the raw received information into corrected output data. The gain imbalance $\gamma$ indicated by the ratio of the principal axes is employed in the adjustment of the relative gains of these two mixers (blocks 122 and 123). As discussed with reference to the DC offsets, this could be done by adjusting components associated with the I and Q channels but preferably the gain imbalance $\gamma$ is used to transform the raw I and Q signals into corrected output data, for example in a computer. The quadrature error $\phi$ reflected by the skew of the axes controls the adjustment of the quadrature splitting by the power divider 16 (blocks 124 and 125). As discussed with reference to the other calibration factors, this could be done by adjusting components associated with the power divider 16 but preferably the quadrature error is used to transform the raw signals into corrected output data. Finally, the scaling factor $\rho$ is used in the adjustment of the overall gain of the system (blocks 126 and 127), concluding the calibration (block 128). Again, although this could be done by adjustments in the I and Q channels of the demodulator, preferably the scaling factor is used to transform the I and Q signals from the demodulator into corrected output data.

As an additional feature, this statistical approach to the determination of the calibration factors provides a measure of the accuracy and precision in the determined factors. In this regard, uncertainties in the calibration factors can be obtained by means of the standard error (SE) for each determined factor. For example, an approximate 95% confidence interval for the determined value is given by $\pm 2$ (SE). In other words, there is a 95% probability that the correct calibration factor falls within the range defined by the determined factor $\pm 2$ (SE). Preferably, the standard error (SE) is calculated by means of a root-mean-square measure of the differences between the measured values and their fitted values according to the calculated parameters.

Figure 4:
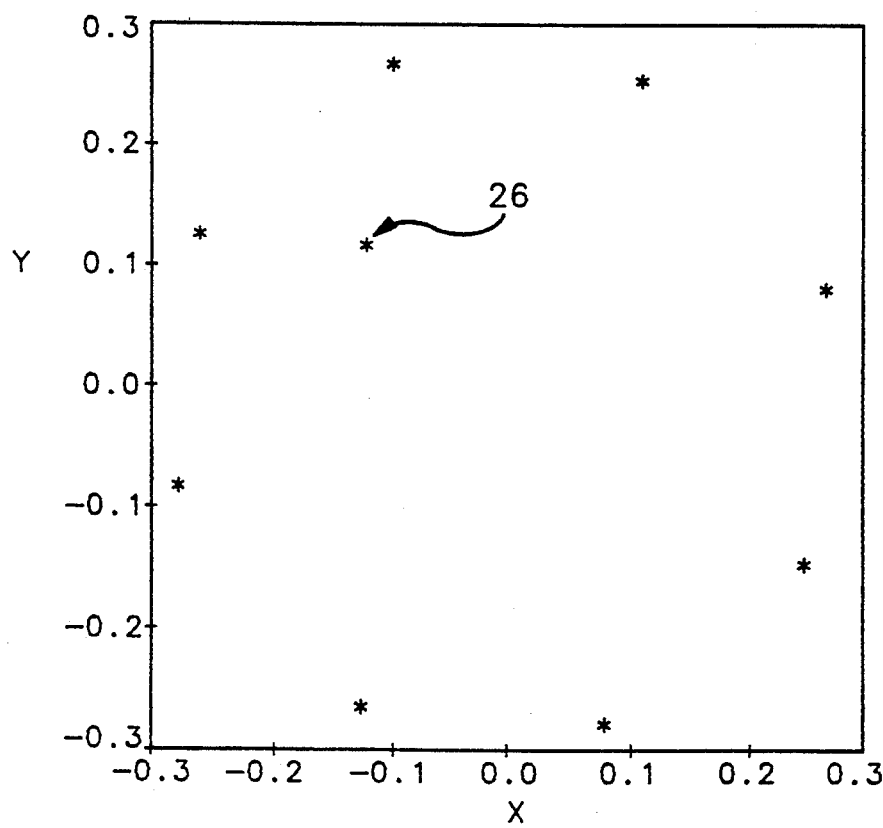
FIG. 4 is a graph illustrating another example of another received 8PSK signal having an aberrant value.

In the calibration technique of the present invention, in which the measured data points are fitted to a geometric model that can be defined by conventional parameters, certain data points may not fit the model very well. An example of such a situation is illustrated in FIG. 4. In this example, numerous samples of each of the states may result in eight well-defined coordinates. However, one data point 26 can be seen to significantly deviate from these well-defined points, possibly because of a misidentified state. In some situations the existence of such an aberration could significantly bias the determined parameters. For example, a least squares fitting procedure in which all data points are treated with equal weight might be adversely influenced by such an aberration.

Accordingly, it is preferable to use a weighting scheme which reduces the influence of aberrant measurements on the calibration technique. One such scheme which has been found to work particularly well in the context of the present invention is an iterative procedure known as "robust regression." In this technique, the difference between a measured value and the fitted value is determined. If this difference is large, the measured point receives a lower weight during a successive iteration in the computation of the model parameters. Detailed information regarding this approach can be found in Draper et al, particularly at pp. 342 and 343. Further reference is made to Press et al, *Numerical Recipes*, Cambridge University Press (1986), particularly at pages 521–546, and Hamper et al, *Robust Statistics: The Approach Based On Influence Functions*, Wiley: New York (1986).

From the foregoing, it can be seen that the present invention employs a statistical approach to the determination of calibration factors for a demodulator. In the implementation of this approach, all of the factors are determined simultaneously, and hence their effect upon one another is inherently taken into account. Furthermore, the weighting of each measurement by means of an iterative or robust analysis technique, such as a biweight technique, reduces the effects of anomalies and system performance which causes aberrant measurements. The ability to calculate a standard error and thus determine a range of certainty within a certain level provides a measure of the accuracy of each of the calibration factors, thereby offering a degree of confidence in the results of the technique.

Although suitable for use with a signal having a continuously varying phase, the calibration technique of the present invention does not require such a signal for successful implementation. Rather, the eight data points defined by an 8PSK signal, for example, provides sufficient information to enable the five parameters which define an ellipse to be obtained. For similar reasons, other types of non-continuous signals which provide a sufficient number of data points, such as 16 QAM and 64 QAM signals, can also be employed in the calibration technique with equal success.

Figure 6:
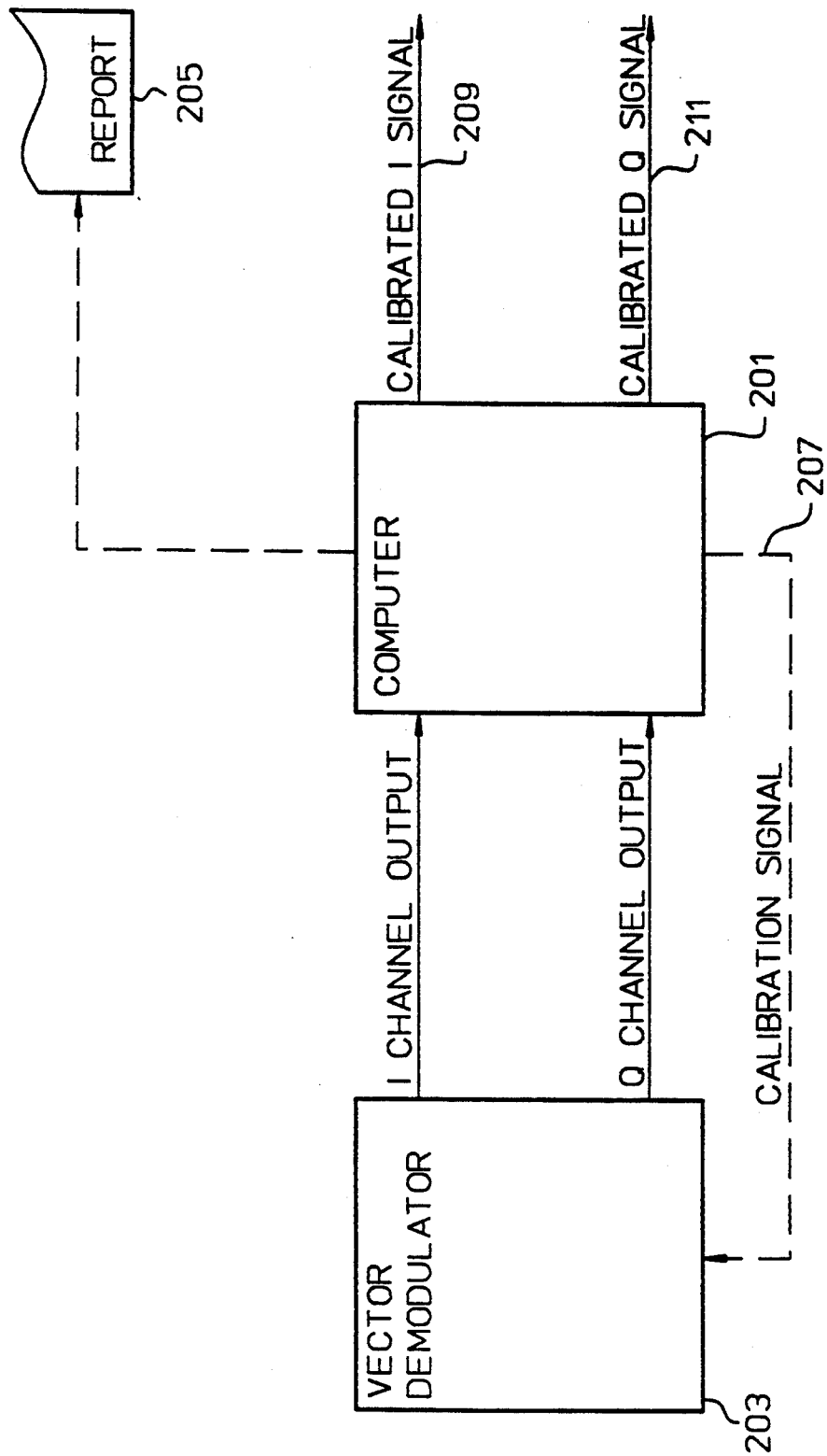
FIG. 6 is a block diagram showing connections between a vector demodulator and a computer according to a preferred embodiment of the invention.

In operation, the calibration method of the present invention preferably is carried out in any suitable computer such as a computer 201 as shown in FIG. 6 which can be appropriately programmed to perform the statistical analyses described previously. The samples of the received and decoded I, Q pairs from a vector demodulator 203 which may be similar to that shown in more detail in FIG. 1 are fed into the computer as data points, and analyzed using the well-known least squares regression or robust regression techniques to determine the relevant parameters of a linearly transformed geometric model. These parameters can then be output by the computer 201 either in the form of a report 205 which can be used to manually calibrate the output data from the demodulator 203, or as signals which can be applied directly to the demodulator 203, as indicated by a signal line 207, to automatically calibrate it. As discussed above, preferably the computer 201 applies the parameters to transform or adjust the I and Q signals to provide corrected data, as indicated by a calibrated I output signal line 209 and a calibrated Q output signal line 211.

It will be appreciated by those of ordinary skill in the art that the present invention can be embodied in other specific forms without departing from the spirit or essential characteristics thereof. For example, although the invention has been described with reference to the generation of five specific parameters that characterize the geometric model, additional parameters can be calculated to produce further calibration factors. One such parameter is the amount of rotation of the principal axis of the ellipse, relative to the I and Q (or x and y) axes. This rotation is reflective of the phase difference between the received signal and the reference signal from the coherent source. A calibration factor related to this measurement can be used to adjust the phase of the reference source.

The presently disclosed embodiments are therefore considered in all respects to be illustrative and not restrictive of the invention. The scope of the invention is defined in the appended claims, rather than the foregoing description, and all changes that come within the meaning and range of equivalents thereof are intended to be embraced therein.

What is claimed is:

1. A method of calibrating a vector demodulator, the method comprising:

receiving an ordered calibration signal having predefined in-phase and quadrature (I and Q) components;

measuring the I and Q components at a plurality of times;

using a statistical method characterized by a tendency to reduce any effect of random errors to calculate a plurality of parameters that describe reshaping a circular model of an ideal signal into an ellipse to fit the measured I and Q components of the received calibration signal, the parameters including the center of the ellipse, the ratio of the axes of the ellipse, the skew of the axes of the ellipse, and the scale of the ellipse;

determining a plurality of calibration values according to the parameters, the calibration value associated with the center of the ellipse defining a DC offset error correction, the calibration value associated with the ratio of the axes of the ellipse defining an I-Q gain imbalance correction, the calibration value associated with the skew of the axes of the ellipse defining a quadrature phase error correction, and the calibration value associated with the scale of the ellipse defining a scaling error correction; and applying the calibration values to the received signal to produce an improved signal.

2. A method according to claim 1 wherein the statistical method comprises regression analysis.

3. A method according to claim 2 wherein regression analysis comprises nonlinear least squares analysis.

4. A method according to claim 3 wherein nonlinear least squares analysis comprises iteratively reweighted nonlinear least squares analysis.

* * * * *